United States Patent
Boville

(10) Patent No.: US 7,073,230 B2
(45) Date of Patent: Jul. 11, 2006

(54) PLASTIC CLIP FOR THE DETACHABLE CONNECTION OF A TRIM PLATE TO A SUPPORT PIECE

(75) Inventor: Daniel Boville, Paris (FR)

(73) Assignee: A. Raymond & CIE, Grenoble (FR)

( * ) Notice: Subject to any disclaimer, the term of this patent is extended or adjusted under 35 U.S.C. 154(b) by 283 days.

(21) Appl. No.: 10/169,412

(22) PCT Filed: Dec. 12, 2000

(86) PCT No.: PCT/EP00/12561

§ 371 (c)(1), (2), (4) Date: Jul. 1, 2002

(87) PCT Pub. No.: WO01/50026

PCT Pub. Date: Jul. 12, 2001

(65) Prior Publication Data
US 2003/0000048 A1   Jan. 2, 2003

(30) Foreign Application Priority Data
Dec. 29, 1999 (DE) ................................ 199 63 721

(51) Int. Cl.
A44B 21/00 (2006.01)

(52) U.S. Cl. .................. 24/297; 24/458; 52/716.7; 52/718.06; 52/717.05; 411/509

(58) Field of Classification Search .................. 24/297, 24/292, 291, 289, 290, 662, 293, 458; 403/11, 403/405.1, 408.1, DIG. 11, 21; 52/718.01, 52/716.5, 716.6, 716.7, 718.04, 718.05, 718.06, 52/717.05, 511; 411/508, 349, 107, 544, 411/509

See application file for complete search history.

(56) References Cited

U.S. PATENT DOCUMENTS 2,946,612 A * 7/1960 Ahlgren ....................... 24/662

(Continued)

FOREIGN PATENT DOCUMENTS

DE        47 30 102 A       3/1995
WO       WO99 20907 A       4/1999

*Primary Examiner*—Jack W. Lavinder
(74) *Attorney, Agent, or Firm*—Gifford, Krass, Groh, Sprinkle, Anderson & Citkowski, P.C.

(57) ABSTRACT

The invention relates to a plastic clip, for the detachable connection of a trim plate to a support piece, in particular, to the door frame of a motor vehicle. The clip comprises a head piece (1) and an anchoring foot (2), which may be inserted in an opening in the support piece (4) and an upper part (3), for fixing to the trim plate (6), which may be connected to the head piece (1) in a snap-fastening manner. The head piece (1) has the form of an open cylinder, with a central recess (7), on the edge (8) of which inwardly-projecting support segments (9) are formed, in order to guarantee application of the clip, even with variations in tolerance between the fixing site on the trim plate (6) and the fixing opening (5) in the support piece (4). Furthermore, a support plate (10) is provided above the anchoring foot (2), above which a T-shaped support pin (11) extends. The head (12) of said pin is of such a size that said pin may be engaged in the central recess, with elastic spreading of the support segments (9), whereby said segments (9) spring back together after the passage of the pin head (12) and, thus, are supported on the underside of the above.

13 Claims, 1 Drawing Sheet

U.S. PATENT DOCUMENTS

| | | | |
|---|---|---|---|
| 3,551,963 A * | 1/1971 | Mosher, Jr. et al. | 24/662 |
| 4,505,611 A * | 3/1985 | Nagashima et al. | 403/21 |
| 4,506,419 A * | 3/1985 | Mitomi | 24/297 |
| 4,810,147 A | 3/1989 | Hirohata | |
| 4,878,792 A * | 11/1989 | Frano | 411/508 |
| 5,056,199 A * | 10/1991 | Stein et al. | 24/682.1 |
| 5,106,223 A | 4/1992 | Kraus | |
| 5,319,839 A * | 6/1994 | Shimajiri | 24/453 |
| 5,509,182 A * | 4/1996 | Nakanishi | 24/297 |
| 5,647,713 A * | 7/1997 | Ge et al. | 24/662 |
| 5,775,860 A * | 7/1998 | Meyer | 411/508 |
| 6,039,523 A | 3/2000 | Kraus | |
| 6,287,043 B1 * | 9/2001 | Kraus | 24/292 |
| 6,394,695 B1 | 5/2002 | Chausset | |
| 6,431,585 B1 * | 8/2002 | Rickabus et al. | 24/458 |
| 6,594,870 B1 * | 7/2003 | Lambrecht et al. | 24/297 |

* cited by examiner

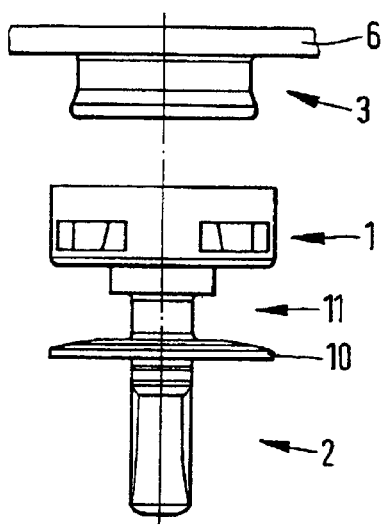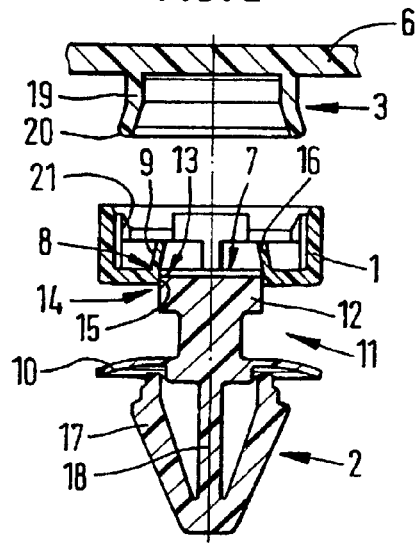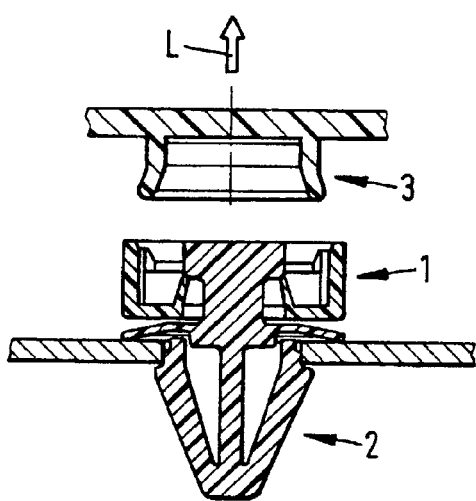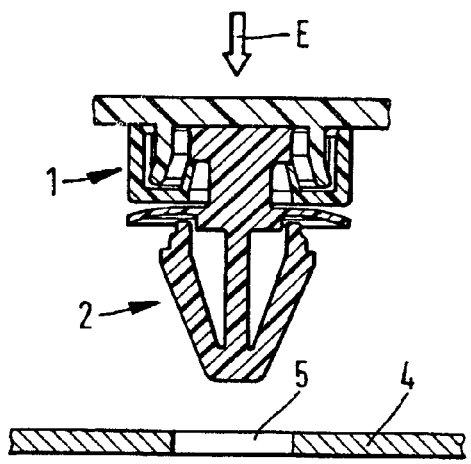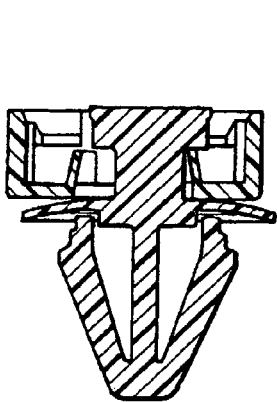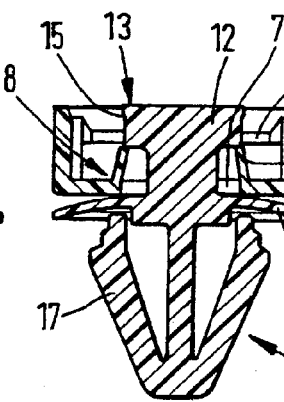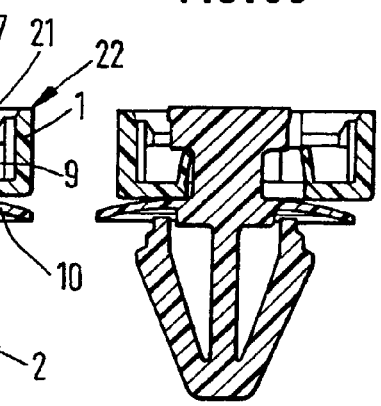

PLASTIC CLIP FOR THE DETACHABLE CONNECTION OF A TRIM PLATE TO A SUPPORT PIECE

REFERENCE TO RELATED APPLICATIONS

This application claims priority to PCT application Serial No. EPO 00/12561, filed Dec. 12, 2000, which claims priority on German patent application Serial No. 19963721.0, filed Dec. 29, 1999. The contents of both of which are incorporated in their entiety.

The invention relates to a plastic clip, for the detachable connection of a trim plate to a support piece, in particular, to the door frame of a motor vehicle. The clip comprises a head piece and an anchoring foot, which may be inserted in an opening in the support piece, and an upper part, for fixing to the trim plate, which may be connected to the head piece in a snap-fastening manner.

Such a clip is known, for example, from DE 43 30 102 C2. With this clip it is considered a disadvantage that the head piece is connected as one piece to the anchoring foot and thus is rigidly mounted. Therefore, with this clip it is impossible to balance variations in tolerance between the fixing sites on the trim plate and the fixing openings in the support piece, if the upper part is rigidly connected to the trim plate.

In order to avoid this disadvantage, the inventive plastic clip is so configured that the head piece has the form of an open cylinder and comprises a central recess, on the edge of which inwardly-projecting support segments are formed. A support plate is provided above the anchoring foot, above which a T-shaped support pin extends. The head of the support pin is of such a size that said pin may be engaged in the central recess, with elastic spreading of the support segments, wherein said segments spring back together after the passage of the pin head and thus are supported on the underside of said head.

For reasons of casting it is appropriate if the head of the support pin at the upper edge is connected to the lower edge of the central recess via thin detachably connected webs. As a result, the two-part clip can be sprayed advantageously in a casting mold and subsequently can be combined into a clip by pressing the support head in the central recess of the head piece. Consequently, another advantage is realized in that the head of the support pin opposite the edges of the support segments can be moved radially to balance variation in tolerance.

Similar to the prior art, the upper part, which may be connected to the head piece in a snap-fastening manner, usually is inserted in a keyhole-like pocket formed on the trim plate. However, because the variation in tolerance is balanced between the head piece and the support pin above the anchoring foot, it is appropriate and, from a production point of view, by all means feasible to integrate the upper part directly with the trim plate.

BRIEF DESCRIPTION OF THE DRAWINGS

An inventive embodiment is shown in the drawing and explained in greater detail in the following. In the drawing:

FIG. 1 shows a side elevation of the plastic clip in delivery condition below an upper part which is formed on the trim plate;

FIG. 2 shows a profile of the same plastic clip with an upper part according to line II—II in FIG. 1;

FIG. 3 shows the same clip in assembled condition with pressed-on upper part above the opening of the support piece;

FIG. 4 shows the same clip after insertion in the opening and subsequent removal from the upper part; and FIG. 5 shows three examples for the radial movability of the head piece to the a to c support pin with assembled clip.

DETAILED DESCRIPTION OF THE PREFERRED EMBODIMENT

The plastic clip shown in the figures essentially consists of a head piece 1, an anchoring foot 2, and an upper part 3 which is fixed to a trim plate 6 is connectable to the head piece 1 in a snap-fastening manner.

As is indicated, especially in FIG. 2, the anchoring foot 2 is formed by two spring-loaded compressible support legs 17 which are connected to an umbrella-like support plate 10 via a central web 18 and which can be inserted in an opening 5 of a support part 4. As soon as the support plate 10 lies upon the support part 4 and the support legs 17 have passed the opening 5 of the support part 4, the support legs spring apart and attach in a known manner at the rear edge of the opening 5. Any plates, in particular, the door frame of a motor vehicle, can be used as support part 4.

The head piece 1 has the form of an open cylinder with a central recess 7, on the upper edge 8 of which inwardly-projecting support segments 9 are formed which follow the arc of the edge. A T-shaped support pin 11 extends above the support plate 10, the head 12 of which is so dimensioned that said pin 11 may be engaged in the central recess 7, with elastic spreading of the support segments 9.

In the present embodiment, the upper edge 13 of head 12 of the support pin 11 is detachably connected to the lower edge 14 of the central recess 7 via several webs 15 which are distributed evenly on the periphery. As a result, the head piece 1 and the anchoring foot 2 are interconnected as one piece from production to delivery (FIG. 2). These elements are first pressed together by the manufacturer of the trim plate 6 by pressing on of the upper part 3 which causes elastic spreading of the support segments 9 (FIG. 3), wherein the segments 9 spring back together after the passage of the pin head 12 and the edges 16 of said segments are supported at the underside thereof.

As is indicated in FIG. 5 a to c, when engaged, the head 12 of the support pin 11 is radially movable so that the anchoring foot 2 can easily be adjusted to the proper position when inserting said foot in the opening 5 of support part 4.

In the present embodiment, the upper part 3 is integrated with the trim plate 6, i.e., formed as a single piece, and consists of a ring 19 whose edge 20 can easily be directed towards the outside. Correspondingly, the head piece 1 includes at least three detents 21 distributed around the periphery of its upper edge 22 projecting towards the inside that interact with the edge 20 in a snap-fastening manner.

FIG. 3 shows the plastic clip in assembled condition with the snapped-on upper part 3 prior to inserting the anchoring foot 2 in the direction of the arrow "E" in the opening 5 of the support piece 4. FIG. 4 shows the plastic clip which is firmly anchored in the support piece 4, after the upper part 3 has been detached in the direction of the arrow "L," while the anchoring foot 2 remains in the opening 5 of the support piece 4.

The invention claimed is:

1. A plastic clip for attachably connecting a trim plate to a support piece said clip comprising:
   an upper part connected to the trim plate, said upper part having a ringed edge that extends outwardly;
   a head piece operative to attach to said upper part in snap fit engagement, said head piece having an anchoring foot adapted for insertion into an opening in the support piece, an open cylinder having an edge defining a central recess and a support segment extending from said edge, said anchoring foot having a support plate and a T shaped support pin, said pin having a head portion adapted to be received in the central recess and an upper edge of said support pin is detachably connected to a lower edge of the central recess by a connecting web, wherein said support segment is deformable to receive said head portion through the recess when said connecting web is detached, and said support segment returns to its original position after the head portion passes through the central recess to engage a portion of said head portion, and said head piece has complementary detents to engage said ring edge of said upper part in a snap fit manner.

2. A plastic clip for attachably connecting a trim plate to a support piece, said clip comprising:
   an upper part connected to the trim plate;
   a head piece operative for attachment to said upper part in snap fit engagement, said head piece having an anchoring foot adapted for insertion into an opening in said support piece and an open cylinder, said open cylinder having an edge defining a central recess and a deformable support segment extending radially inwardly from said edge, said support segment having an end portion, said anchoring foot having a support plate and a T shaped support pin, said pin having a head with an annular surface, wherein said head is adapted to be radially movable within the central recess for adjusting the anchoring foot in the opening in the support piece, and said support segment engages said annular surface to prevent extraction of said pin.

3. The plastic clip of claim 2, wherein the head of the support pin on the upper edge is detachably connected to the lower edge of the central recess by a connecting web.

4. The plastic clip of claim 2, wherein the upper part is integrated directly with the trim plate.

5. A plastic clip for attachably connecting a trim plate to a support piece, said clip comprising:
   an upper part connected to the trim plate;
   a head piece operative for attachment to said upper part in snap fit engagement, said head piece having an anchoring foot adapted for insertion into an opening in said support piece and an open cylinder, said open cylinder having an edge defining a central recess and a deformable support segment extending radially inwardly from said edge, said support segment having an end portion, said anchoring foot having a support plate and a T shaped support pin, said pin having a head with an annular surface, wherein said pin is adapted to be radially movable within the central recess, and said support segment engages said annular surface to hold said pin from extraction and facilitate the radial movement;
   wherein the upper part includes a ring having an edge directed towards the outside, and the head piece on its opposite edge includes at least three detents projecting towards the inside, interacting with the edge in a snap-fastening manner.

6. The plastic clip of claim 5, wherein the head of the support pin on the upper edge is detachably connected to the lower edge of the central recess by a connecting web.

7. The plastic clip of claim 5, wherein the upper part is formed integral with the trim plate.

8. A plastic clip for attachably connecting a trim plate to a support piece, said clip comprising:
   an upper part connected to the trim plate;
   a head piece operative to attach to said upper part in snap fit engagement, said head piece having an anchoring foot adapted for insertion into an opening in the support piece, an open cylinder having an edge defining a central recess and a support segment extending from said edge, said anchoring foot having a support plate and a T shaped support pin, said pin having a head portion adapted to be received in the central recess, said head piece including a frangible connecting web extending between the edge of the cylinder and an upper edge of said pin, wherein said support segment is deformable to receive said head portion through the recess when said connection web is detached, and said support segment returns to its original position after the head portion passes through the central recess to engage a portion of said head portion.

9. The plastic clip of claim 8, wherein the head of the support pin is radially movable when engaged in the central recess.

10. The plastic clip of claim 8, wherein said upper part is formed integral to said trim plate.

11. A plastic clip for attachably connecting a trim plate to a support piece, said clip comprising:
    an upper part connected to the trim plate;
    a head piece operative to attach to said upper part in snap fit engagement, said head piece having an anchoring foot adapted for insertion into an opening in the support piece, an open cylinder having an edge defining a central recess and a support segment extending from said edge, said anchoring foot having a support plate and a T shaped support pin, said pin having a head portion adapted to be received in the central recess, said head piece including a frangible connecting web extending between the edge of the cylinder and an upper edge of said pin, wherein said support segment is deformable to receive said head portion through the recess when said connection web is separated, and said support segment returns to its original position after the head portion passes through the central recess to engage a portion of said head portion;
    wherein said upper part includes a ringed edge that extends outwardly and operates to engage complementary detents formed on said head piece in a snap fit manner.

12. The plastic clip of claim 11, wherein the head of the support pin is radially movable when engaged in the central recess.

13. The plastic clip of claim 11, wherein said upper part is formed integral with the trim plate.

* * * * *